US012766737B2

(12) United States Patent
Koo et al.

(10) Patent No.: US 12,766,737 B2
(45) Date of Patent: Oct. 20, 2026

(54) SERVING ROBOT AND CONTROL METHOD THEREOF

(71) Applicant: SAMSUNG ELECTRONICS CO., LTD., Suwon-si (KR)

(72) Inventors: Donghan Koo, Suwon-si (KR); Sanghyun Kang, Suwon-si (KR); Hyunsuk Kwak, Suwon-si (KR); Minhee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 18/529,557

(22) Filed: Dec. 5, 2023

(65) Prior Publication Data

US 2024/0100711 A1 Mar. 28, 2024

Related U.S. Application Data

(63) Continuation of application No. PCT/KR2023/013833, filed on Sep. 14, 2023.

(30) Foreign Application Priority Data

Sep. 15, 2022 (KR) ........................ 10-2022-0116619
Sep. 28, 2022 (KR) ........................ 10-2022-0123306

(51) Int. Cl.
*B25J 11/00* (2006.01)
*B25J 9/16* (2006.01)

(52) U.S. Cl.
CPC ........... *B25J 11/008* (2013.01); *B25J 9/1612* (2013.01); *B25J 9/162* (2013.01); *B25J 9/1651* (2013.01); *B25J 9/1697* (2013.01)

(58) Field of Classification Search
CPC ........ B25J 11/008; B25J 9/1612; B25J 9/162; B25J 9/1651; B25J 9/1697; B25J 9/1679;
(Continued)

(56) References Cited

U.S. PATENT DOCUMENTS 7,649,331 B2 * 1/2010 Hosoda ................ B62D 57/024 901/1
10,369,703 B2 8/2019 Miyamoto
(Continued)

FOREIGN PATENT DOCUMENTS

CN 103640032 A 3/2014
CN 210704912 U 6/2020
(Continued)

OTHER PUBLICATIONS

International Search Report (PCT/ISA/210) issued on Dec. 26, 2023 by the International Searching Authority in International Patent Application No. PCT/KR2023/013833.
(Continued)

*Primary Examiner* — Adam R Mott
*Assistant Examiner* — Alan Lindsay Ostrow
(74) *Attorney, Agent, or Firm* — Sughrue Mion, PLLC

(57) ABSTRACT

A serving robot and a control method thereof are disclosed. The serving robot includes a main body, a loading part on which food is loaded, an arm of which one end is rotatably connected to the main body, and the other end is rotatably connected to the loading part, a driving part, and at least one processor, wherein the at least one processor is configured to control the driving part so that the loading part maintains horizontality at the time of a forward rotation or a backward rotation of the arm.

18 Claims, 15 Drawing Sheets

(58) Field of Classification Search
CPC . B25J 5/007; B25J 11/00; G05B 2219/40298; G05B 2219/45111
See application file for complete search history.

(56) References Cited

U.S. PATENT DOCUMENTS

| | | | | |
|---|---|---|---|---|
| 2015/0012163 | A1* | 1/2015 | Crawley | B25J 11/008 701/23 |
| 2017/0057093 | A1 | 3/2017 | Miyamoto | |
| 2021/0139065 | A1* | 5/2021 | Ha | B62B 5/0026 |
| 2022/0035373 | A1* | 2/2022 | Inamoto | B25J 9/162 |
| 2023/0364801 | A1 | 11/2023 | Hwang | |

FOREIGN PATENT DOCUMENTS

| | | | | |
|---|---|---|---|---|
| CN | 212044751 | U | 12/2020 | |
| JP | 2011-5608 | A | 1/2011 | |
| JP | 6665450 | B2 | 3/2020 | |
| KR | 10-0685339 | B1 | 2/2007 | |
| KR | 20080089344 | A * | 10/2008 | A61P 31/14 |
| KR | 20090028566 | A * | 3/2009 | G06F 11/1004 |
| KR | 10-2010-0026768 | A | 3/2010 | |
| KR | 10-2010-0030408 | A | 3/2010 | |
| KR | 10-1001924 | B1 | 12/2010 | |
| KR | 10-1083700 | B1 | 11/2011 | |
| KR | 10-1507368 | B1 | 3/2015 | |
| KR | 10-1950566 | B1 | 2/2019 | |
| KR | 10-2005405 | B1 | 7/2019 | |
| KR | 10-2244615 | B1 | 4/2021 | |
| KR | 10-2333675 | B1 | 12/2021 | |
| KR | 20220037966 | A * | 3/2022 | H04W 74/0833 |
| KR | 10-2391562 | B1 | 4/2022 | |
| KR | 20220051406 | A * | 4/2022 | |
| KR | 10-2416323 | B1 | 7/2022 | |
| KR | 20230089680 | A * | 6/2023 | B25J 9/1694 |

OTHER PUBLICATIONS

Written Opinion (PCT/ISA/237) issued on Dec. 26, 2023 by the International Searching Authority in International Patent Application No. PCT/KR2023/013833.

Anh X. H. Dang et al., "Active Acceleration Compensation for Transport Vehicles Carrying Delicate Objects", IEEE Transactions on Robotics, vol. 20, No. 5, Oct. 2004, pp. 830-839, DOI: 10.1109/TRO.2004.832791, XP011119597.

René Graf et al., "Active Acceleration Compensation Using a Stewart-Platform on a Mobile Robot", Proceedings Second EUROMICRO Workshop on Advanced Mobile Robots, Oct. 1997, pp. 59-64, DOI: 10.1109/EURBOT.1997.633569, XP010255389.

Communication issued on Jul. 9, 2025 by the European Patent Office for European Patent Application No. 23865870.2.

* cited by examiner

INITIAL STAGE

SERVING ROBOT AND CONTROL METHOD THEREOF

CROSS-REFERENCE TO RELATED APPLICATION

This application is a bypass continuation of International Application No. PCT/KR2023/013833, filed on Sep. 14, 2023, which is based on and claims priority to Korean Patent Application No. 10-2022-0116619, filed on Sep. 15, 2022, and Korean Patent Application No. 10-2022-0123306, filed on Sep. 28, 2022, in the Korean Intellectual Property Office, the disclosures of which are incorporated by reference herein in their entireties.

BACKGROUND

1. Field

Embodiment of the disclosure relate to a robot and a method of controlling the serving robot.

2. Description of Related Art

Recently, automation technologies using robots are being provided in varies fields. For instance, products are being manufactured by using robots in factories. Moreover, food items ordered by customers are cooked in restaurants by robots and are further served or delivered to the customers by robots.

A robot may receive input of an order for food by a touch method or a voice method from a user, and cook the food according to a set recipe. Also, a robot may identify a user's location and the surrounding environment, and serve the ordered food to the user's location in consideration of the identified surrounding environment.

SUMMARY

According to an aspect of the disclosure, there is provided a serving robot including: a main body; a loading part configured to load an object; an arm including a first end rotatably connected to the main body, and a second end rotatably connected to the loading part; a driver part; and at least one processor is configured to: control the driver part to maintain horizontality of the loading part at a time when the arm is rotated in a first direction or a second direction opposite to the first direction.

The serving robot may further include: a sensor configured to detect acceleration or deceleration of the main body, wherein the object is a food item, and wherein the at least one processor is configured to: based on the food item being loaded on the loading part and the serving robot moving, obtain, from the sensor, first information based on the detected acceleration or deceleration of the main body, and based on the first information, control the driver part to rotate the arm in the first direction or in the second direction to offset an effect of the acceleration or deceleration of the main body in the loading part.

The at least one processor may be configured to: based on the serving robot accelerating in the first direction, control the driver part to rotate the arm in the second direction from an initial location, by a first angle centered around an axis on the first end of the arm connected to the main body based on the first information of the main body, and control the driver part to rotate the loading part so that the loading part maintains horizontality based on the first angle.

The at least one processor may be configured to: based on the serving robot maintaining a constant velocity after the acceleration, control the driver part to rotate the arm in the first direction centered around the axis on the first end of the arm to move the arm to the initial location, and control the driver part to rotate the loading part so that the loading part maintains horizontality based on the rotation of the arm in the first direction.

The at least one processor may be configured to: based on the serving robot decelerating in the first direction, control the driver part to rotate the arm in the first direction from an initial location, by a second angle centered around an axis on the first end of the arm connected to the main body based on the first information of the main body, and control the driver part to rotate the loading part so that the loading part maintains horizontality based on the second angle.

The at least one processor may be configured to: based on the serving robot maintaining a constant velocity after the deceleration, control the driver part to rotate the arm in the second direction centered around the axis on the first end of the arm to move the arm to the initial location, and control the driver part to rotate the loading part so that the loading part maintains horizontality based on the rotation of the arm in the second direction.

The at least one processor may be configured to: obtain, from the sensor, tilt information of the main body, and control the driver part to rotate at least one of the arm or the loading part based on the tilt information of the main body to maintain horizontality of the loading part.

The loading part may include a first surface including a tray, and a second surface including a display, and wherein the at least one processor may be configured to: control the driver part to rotate the loading part to face the tray or the display in an upward direction, and based on the display facing in the upward direction, control the display to display information related to the food item.

The serving robot may further include a camera, wherein the at least one processor may be configured to: control the camera to capture an image, and based on identifying an customer from the captured image while food item is not loaded on the loading part, control the driver part to rotate the loading part so that the display is facing toward the upward direction.

The at least one processor may be configured to identify food item selected by the customer.

The at least one processor may be configured to: control the driver part to rotate the loading part so that the tray is facing toward the upward direction for loading the food item, and based on the identified customer and the food item selected by the customer, control the driver part to rotate the arm and the loading part for serving the food item to the customer.

According to another aspect of the disclosure, there is provided a control method of a serving robot, the method including: moving the serving robot based on an object being loaded on a loading part of the serving robot; rotating an arm connected to a main body of the serving robot, the arm including a first end rotatably connected to the main body, and a second end rotatably connected to the loading part; and maintains the horizontality of the loading part at a time when the arm is rotated in a first direction or a second direction opposite to the first direction.

DETAILED DESCRIPTION

Figure 1:
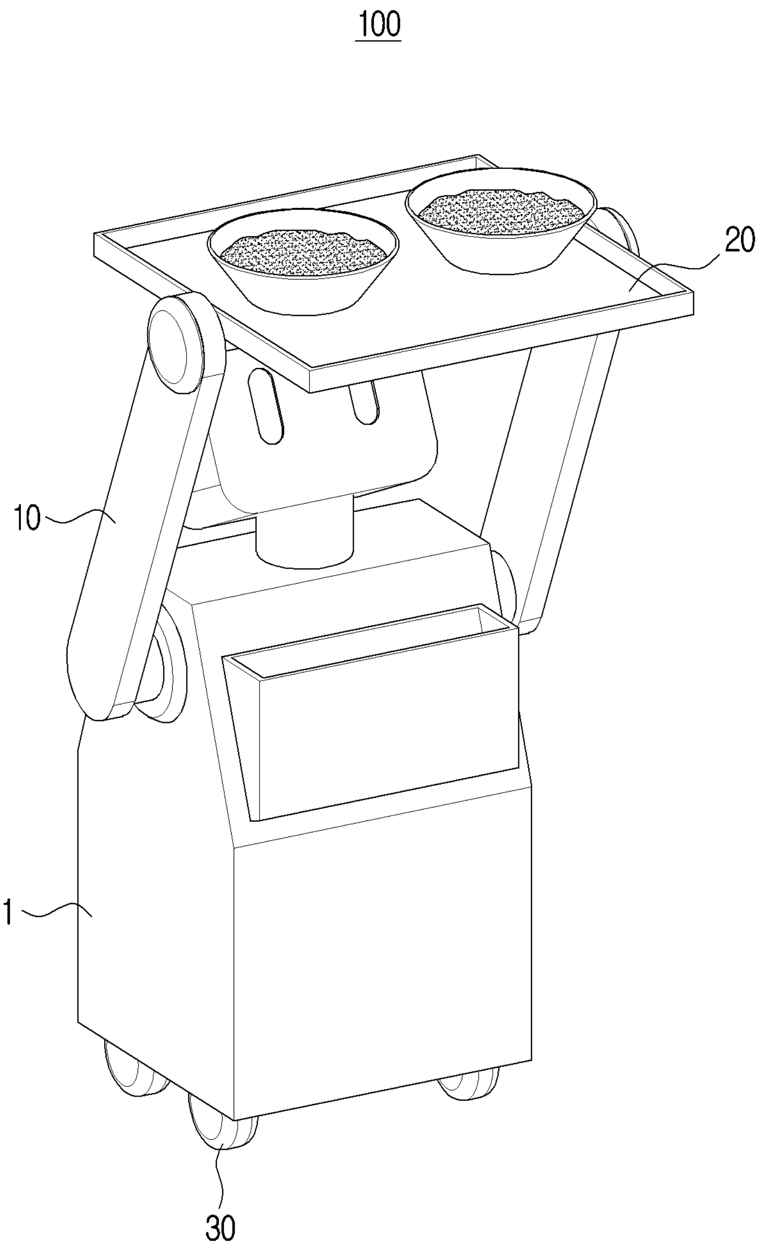
FIG. 1 is a perspective view of a serving robot according to one or more embodiments of the disclosure.

Hereinafter, various embodiments will be described in more detail with reference to the accompanying drawings. The embodiments described in this specification may be modified in various ways. Also, specific embodiments may be illustrated in the drawings, and described in detail in the detailed description. However, specific embodiments disclosed in the accompanying drawings are just for making the various embodiments easily understood. Accordingly, the technical idea of the disclosure is not restricted by the specific embodiments disclosed in the accompanying drawings, and the embodiments should be understood as including all equivalents or alternatives included in the idea and the technical scope of the disclosure.

Also, in the disclosure, terms including ordinal numbers such as 'the first' and 'the second' may be used to describe various components, but these components are not limited by the aforementioned terms. The aforementioned terms are used only for the purpose of distinguishing one component from another component.

In addition, in this specification, terms such as "include" and "have" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof. Further, the description in the disclosure that an element is "coupled with/to" or "connected to" another element should be interpreted to mean that the one element may be directly coupled with/to or connected to the another element, but still another element may exist between the elements. In contrast, the description that one element is "directly coupled" or "directly connected" to another element can be interpreted to mean that still another element does not exist between the one element and the another element.

Meanwhile, "a module" or "a part" for the elements used in this specification performs at least one function or operation. Also, "a module" or "a part" may perform a function or an operation by hardware, software, or a combination of hardware and software. Also, a plurality of "modules" or a plurality of "parts" except "a module" or "a part" that needs to be implemented in specific hardware or is performed in at least one processor may be integrated into at least one module. Further, singular expressions include plural expressions, unless defined obviously differently in the context.

Also, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

Further, in this specification, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

In addition, in describing the disclosure, in case it is determined that detailed explanation of related known functions or features may unnecessarily confuse the gist of the disclosure, the detailed explanation will be abridged or omitted. Meanwhile, each embodiment of the disclosure may be independently implemented or operated, but it may also be implemented or operated in combination with another embodiment.

FIG. 1 is a perspective view of a serving robot according to one or more embodiments of the disclosure.

Referring to FIG. 1, a serving robot 100 may include a main body 1, an arm 10, a loading part 20, and a wheel 30.

The main body 1 may include various components configured to perform various operations of the server robot 100, such as driving the serving robot 100. For example, the main body 1 may include components such as a processor, a communication interface, a sensor, a camera, a microphone, a speaker, a memory, etc. However, the disclosure is not limited thereto, and as such, according to another embodiment, some of these components may be omitted from the main body 1 and/or other components may be further included in the main body 1.

According to an embodiment, the arm 10 may be connected to the main body 1. For example, one end (e.g., a first end) of the arm 10 may be rotatably connected to the main body 1, and the other end (e.g., a second end) of the arm 10 may be rotatably connected to the loading part 20. The longitudinal direction of the arm 10 may be towards in the upper direction with respect the bottom surface of the main body 1. For example, the longitudinal direction of the arm 10 may be arranged perpendicularly to the bottom surface of the main body 1. The arm 10 may rotate forward or rotate backward based on a connection axis connected to the main body 1 according to a movement of the serving robot 100. As an example, the arm 10 may rotate within a range of 30 degrees forward to 30 degrees backward based on the vertical axis with respect to the bottom surface of the main body 1. Meanwhile, the aforementioned rotation angles are merely an example, and as such, according to another embodiment, rotation angles are not limited thereto. Accordingly, the arm 10 may rotate in a range different than 30 degrees forward or backward based on the vertical axis with respect to the bottom surface of the main body 1. However, according to another embodiment, the arm 10 may not rotate more than 90 degrees forward and more than 90 degrees backward. In FIG. 1, two arms 10 connected to both side surfaces of the main body 1 are illustrated. However, the disclosure is not limited thereto, and as such, depending on cases, one arm 10 may be connected to one side surface or a plurality of arms 10 may be attached to the main body. Also, the arm 10 may be attached to the main body 1 at location different from the side surface of the main body 1. For instance, the arm 10 may be connected to the main body 1 on a front surface or a top surface of the main body 1. According to an embodiment, the arm 10 may be a telescopic arm capable being extended.

The loading part 20 may be rotatably connected to the arm 10. For example, the center area of the side surface of the loading part 20 may be connected to the arm 10. In case food is loaded on the loading part 20, the loading part 20 may rotate to maintain horizontality according to a rotation of the arm 10. The loading part 20 may rotate forward or rotate backward based on the connection axis connected to the arm 10. As an example, the loading part 20 may rotate in 360 degrees forward or backward. Although FIG. 1 illustrates a case in which food is loaded on the loading part 20, the disclosure is not limited thereto, and as such, according to another embodiment, other objects may be loaded on the loading part 20. According to an embodiment, the loading part 20 may be referred to as a platform or a loading platform.

According to an embodiment, one surface (e.g., a first surface) of the loading part 20 may include a tray, and the other surface (e.g., a second surface) may include a display. For example, if the serving robot 100 identifies a user or a customer while food is not loaded, the serving robot 100 may rotate the loading part 20 so that the display is facing toward the upper direction. In this manner, the customer or the user may be able to view a menu displayed on the display. The display facing toward the upper direction may mean that the display surface is facing in the upper direction of the vertical axis of the bottom surface of the main body 1 or that the display surface is facing in an upward direction with respect to the bottom surface of the main body 1. When the display is facing toward the upper direction, the serving robot 100 may display information related to food on the display. Also, the serving robot 100 may rotate the loading part 20 so that the tray surface is facing toward the upper surface for loading food and serving the food. When food is loaded on the loading part 20, the serving robot 100 may maintain the loading part 20 to be horizontal for stable delivery of food.

The wheel 30 may be located in the lower end part of the main body 1. The wheel 30 may move the serving robot 100. In FIG. 1, a plurality of independent wheels 30 are illustrated, but the disclosure is not limited thereto, and as such, the serving robot 100 may include wheels 30 in various numbers. For example, the serving robot 100 may include 1 to 8 wheels 30. According to an embodiment, the wheel 30 may be implemented in a form of a caterpillar.

Hereinafter, the components included in the serving robot 100 will be described in detail.

Figure 2:
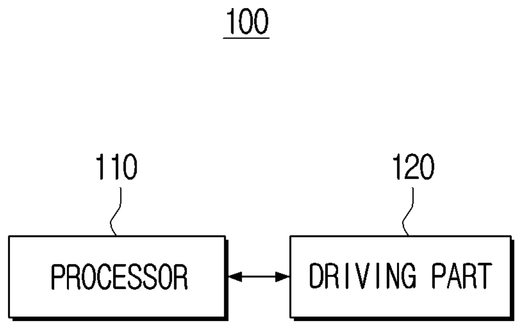
FIG. 2 is a block diagram illustrating a configuration of a serving robot according to one or more embodiments of the disclosure.

FIG. 2 is a block diagram illustrating a configuration of a serving robot according to one or more embodiments of the disclosure.

Referring to FIG. 2, the serving robot 100 may include a processor 110 and a driving part 120.

The processor 110 may control each component of the serving robot 100. The serving robot 100 may include a processor 110. However, the disclosure is not limited thereto, and as such, the sever robot 100 may include a plurality of processors 110. The processor 110 may control an overall operation of the serving robot 100. The processor 110 may include one or more cores (e.g., a homogeneous multi-core or a heterogeneous multi-core). The processor 110 may be or include, for example, at least one of a central processing unit (CPU), an image signal processing unit (ISP), a digital signal processing unit (DSP), a graphics processing unit (GPU), a vision processing unit (VPU), and a neural processing unit (NPU). The processor 111 may execute various application programs loaded onto a memory (e.g., on-chip memory).

The processor 110 may control the driving part 120 so that the serving robot 100 moves or operates. The driving part 120 may be a driver. The processor 110 may control the driving part 120 to rotate the arm 10 forward or backward according to acceleration and deceleration of the serving robot 100. For example, the processor 110 may control the driving part 120 so that the loading part 20 maintains horizontality according to a forward rotation or a backward rotation of the arm 10. Also, the processor 110 may control the driving part 120 to move the serving robot 100.

According to an embodiment, the processor 110 may control the driving part 120 to rotate the arm 10 so that the loading part 20 is accelerated and decelerated to offset the acceleration and deceleration of the main body 1. For example, when the serving robot 100 is accelerated, the processor 110 may control the driving part 120 to rotate the arm 10 backward centered around an axis on one end of the arm 10 connected to the main body 1 (the connection axis connected to the main body) by a first angle corresponding to the acceleration information of the main body 1. Then, the processor 110 may control the driving part 120 to rotate the loading part 20 so that the loading part 20 maintains horizontality based on the first angle. The first angle may be a predetermined angle.

If the serving robot 100 maintains a constant velocity after it was accelerated, the processor 110 may control the driving part 120 to rotate the arm 10 forward centered around the axis on one end of the arm 10 to move the arm 10 to the initial location based on the information on the change of the velocity of the main body 1. Accordingly, the processor 110 may control the driving part 120 to rotate the loading part 20 so that the loading part 20 maintains horizontality based on the forward rotation of the arm 10.

If the serving robot 100 is decelerated, the processor 110 may control the driving part 120 to rotate the arm 10 forward centered around the axis on one end of the arm 10 connected to the main body 1 by a second angle corresponding to the deceleration information of the main body 1. Accordingly, the processor 110 may control the driving part 120 to rotate the loading part 20 so that the loading part 20 maintains horizontality based on the second angle. The second angle may by a predetermined angle.

If the serving robot 100 maintains a constant velocity after it was decelerated, the processor 110 may control the driving part 120 to rotate the arm 10 backward centered around the axis on one end of the arm 10 to move the arm 10 to the initial location based on the information on the change of the velocity of the main body 1. Accordingly, the processor 110 may control the driving part 120 to rotate the loading part 20 so that the loading part 20 maintains horizontality based on the backward rotation of the arm 10.

The serving robot 100 may move on a slope. In the case, the serving robot 100 may move on a slope, the processor 110 may control the driving part 120 to rotate the arm 10 and/or the loading part 20 so that the loading part 20 maintains horizontality based on the tilt of the main body 1 according to the tilt of the slope.

The driving part 120 may rotate the arm 10 and/or the loading part 20. According to an embodiment, the driving part 120 may move the serving robot 100.

Figure 3:
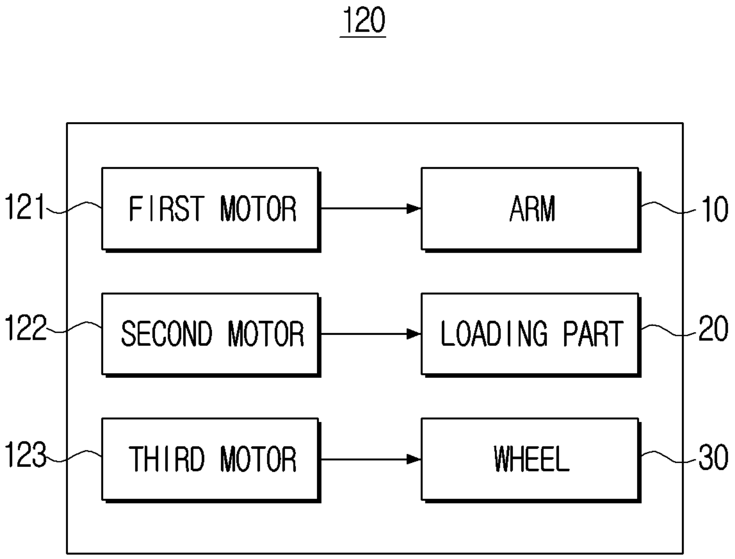
FIG. 3 is a block diagram illustrating a configuration of a driving part according to one or more embodiments of the disclosure.

FIG. 3 is a block diagram illustrating a configuration of a driving part according to one or more embodiments of the disclosure.

Referring to FIG. 3, the driving part 120 may include a first motor 121, a second motor 122, a third motor 123, an arm 10, a loading part 20, and a wheel 30. However, the disclosure is not limited thereto, and as such, according to another embodiment, some of these components may be omitted from the driving part 120 and/or other components may be further included in the driving part 120.

For example, the first motor 121 may rotate the arm 10 forward or backward by control by the processor 110. The second motor 122 may rotate the loading part 20 forward or backward to maintain the horizontality of the loading part 20 by control by the processor 110. According to an embodiment, the second motor 122 may rotate the loading part 20 so that the tray surface or the display surface of the loading part 20 is facing toward the upper direction. The third motor 123 may drive the wheel 30 so that the serving robot 100 moves by control by the processor 110. According to an embodiment, the driving part 120 may further includes connecting portions, such as gears, which connect the first motor 121 to the arm 10, the second motor 122 to the loading part 20, and the third motor 123 to the wheel 30.

Figure 4:
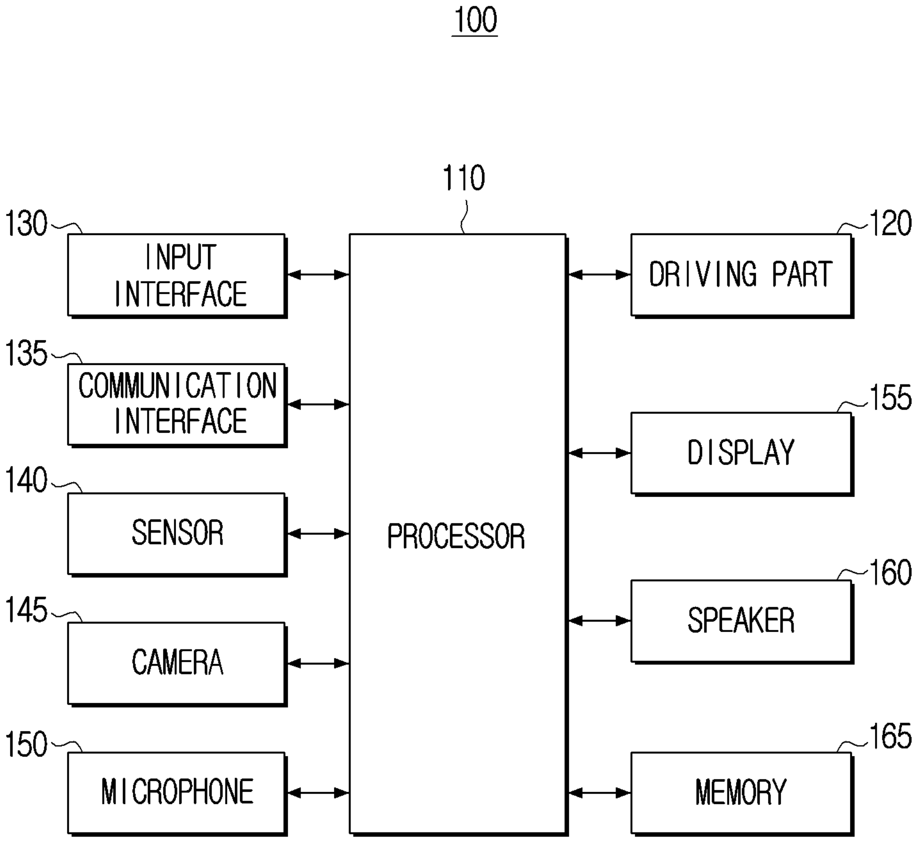
FIG. 4 is a block diagram illustrating a detailed configuration of a serving robot according to one or more embodiments of the disclosure.

FIG. 4 is a block diagram illustrating a detailed configuration of a serving robot according to one or more embodiments of the disclosure.

Referring to FIG. 4, the serving robot 100 may include a processor 110, a driving part 120, an input interface 130, a communication interface 135, a sensor 140, a camera 145, a microphone 150, a display 155, a speaker 160, and a memory 165. The driving part 120 may be identical to what was described in FIG. 2 and FIG. 3.

The input interface 130 may receive input of a control instruction from a user. For example, the input interface 130 may receive input of instructions from a user. The input instructions may include, but is not limited to, power on/off instructions, setting instructions (e.g., setting values for setting operational features of the serving robot 100), menu selection instructions, etc. The input interface 130 may include a keyboard, a button, a keypad, a touch pad, and a touch screen. The input interface 130 may also be referred to as an input device, an input part, an input module, etc.

The communication interface 135 may perform communication with an external device. For example, the communication interface 135 may perform communication with an external device by at least one communication method among communication methods of Wi-Fi, Wi-Fi Direct, Bluetooth, Zigbee, 3rd Generation (3G), 3rd Generation Partnership Project (3GPP), and Long Term Evolution (LTE). The communication interface 135 may receive a driving map, menu information, serving related information, etc. from the external device, and transmit information on the menu selected by the user, information on the state of the serving robot 100, etc. to the external device. The communication interface 135 may also be referred to as a communication device, a communication part, a communication module, a transceiver, etc.

The sensor 140 may detect acceleration and deceleration information of the main body 1, and acceleration and deceleration information of the loading part 20 according to a movement of the serving robot 100. For example, the sensor 140 may include a first sensor to detect acceleration and deceleration of the main body 1, and a second sensor to detect acceleration and deceleration of the loading part 20. Moreover, the sensor 140 may detect tilt information of the bottom surface or tilt information of the serving robot 100. For example, the sensor 140 may include a third sensor to detect tilt of the bottom surface or tilt of the serving robot 100. The detected information may be transmitted to the processor 110. The processor 110 may control the rotation of the arm 10 and/or the loading part 20 based on the information transmitted from the sensor 140. According to an embodiment, the sensor 140 may detect the surrounding environment. The processor 110 may perform a control operation including a movement of the serving robot 100 based on the detected information.

For example, in case the sensor 140 includes an infrared sensor, an ultrasonic sensor, a Time-of-Flight (ToF) sensor, a LiDar, a laser sensor, etc., the sensor 140 may transmit data regarding a transmitted signal and a received signal to the processor 110, and the processor 110 may identify the state of the road surface, whether there are bumps on the bottom, whether there is an obstacle, etc. based on the transmitted transmission data and reception data. According to an embodiment, in case the sensor 140 includes a motion recognition sensor, a heat detection sensor, etc., the sensor 140 may transmit the detected information to the processor 110, and the processor 110 may identify whether there is an obstacle, etc. based on the transmitted information. For example, the sensor 140 may include an angle sensor, an acceleration sensor, a gravity sensor, a gyro sensor, a geomagnetic sensor, a direction sensor, an infrared sensor, an ultrasonic sensor, a Time-of-Flight (ToF) sensor, a LiDar, a laser sensor, a motion recognition sensor, a heat detection sensor, an image sensor, a tracking sensor, a proximity sensor, an illumination sensor, a voltmeter, an ammeter, a barometer, a hygrometer, a thermometer, a touch sensor, etc.

The camera 145 may capture the surrounding environment of the serving robot 100. The captured image may be a still image (e.g., photograph) or a moving image (e.g., a video or multiple frames). The processor 110 may acquire information on the surrounding environment based on the image captured at the camera 145. For example, the processor 110 may acquire information related to the user and information on an obstacle based on the photographed image. The processor 110 may perform a control operation based on the acquired information. As an example, the serving robot 100 may include various kinds of cameras performing different functions. According to an embodiment, the serving robot 100 may include a plurality of cameras of the same kind. For example, the camera 145 may include a CCD sensor and a CMOS sensor. Also, the camera 145 may include an RGB camera, a depth camera, a wide angle camera, a telephoto camera, etc.

The microphone 150 may receive input of a user's voice. For example, the microphone 150 may receive input of a voice ordering food from a user. The processor 110 may recognize the food ordered by the user based on the input voice of the user, and perform a control operation related to serving of the ordered food. For example, the serving robot 100 may include at least one microphone 150. The microphone 150 may include a general microphone, a surround microphone, a directional microphone, etc.

The display 155 may output data processed at the processor 110 as an image. The display 155 may display information, and output a screen corresponding to a recognized instruction of the user. As an example, the display 155 may be arranged on the loading part 20. That is, one surface of the loading part 20 may include a tray, and the other surface may include the display 155. If the display surface of the loading part 20 is facing toward the upper direction, the display 155 may display information related to food (e.g., a menu) by control by the processor 110. The display 155 may be implemented as a liquid crystal display (LCD), organic light emitting diodes (OLED), a flexible display, a touch screen, etc. In case the display 155 is implemented as a touch screen, the serving robot 100 may receive input of a control instruction through the touch screen.

The speaker 160 may output a sound signal. For example, the speaker 160 may output information on an input instruction of a user, information related to food ordered by a user, serving information, information related to warning, information related to the state of the serving robot 100, information related to an operation, etc. as a voice or a notification sound.

The memory 165 may store data performing the functions of the serving robot 100, an algorithm, etc., and may store programs, instructions, etc. driven at the serving robot 100. According to an embodiment, the memory 165 may store data related to food, data related to serving, acceleration and deceleration data of the serving robot 100, data related to driving including a driving map, etc. The algorithm or the data stored in the memory 165 may be loaded on the processor 110 by control by the processor 110, and perform functions related to serving. For example, the memory 165 may be implemented as types such as a ROM, a RAM, an HDD, an SSD, a memory card, etc. According to an embodiment, the memory 165 may be an on-chip memory, which may store various application programs that are executable by the processor 110. The on-chip memory may operate as a cache memory adjacent to the processor 110. The on-chip memory may store a command, an address, and data to be processed by the processor 110 or may store a processing result of the processor 110. The on-chip memory may be, for example, a storage medium or a working memory including a latch, a register, a static random access memory (SRAM), a dynamic random access memory (DRAM), a thyristor random access memory (TRAM), a tightly coupled memory (TCM), etc.

The serving robot 100 may include all of the aforementioned components, or include some components. So far, the configuration of the serving robot 100 was described. Hereinafter, a control operation of the serving robot 100 according to moving of the serving robot 100 will be described.

Figure 5A:
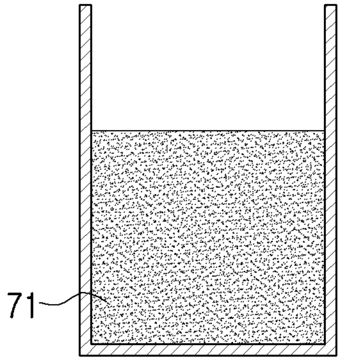
FIGS. 5A, 5B and 5C are diagrams illustrating a driving principle of a serving robot according to one or more embodiments of the disclosure.
Figure 5B:
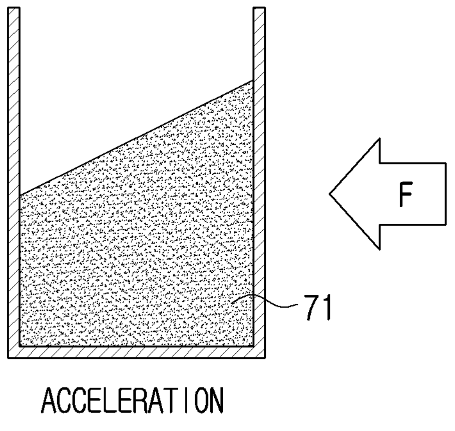
Figure 5C:
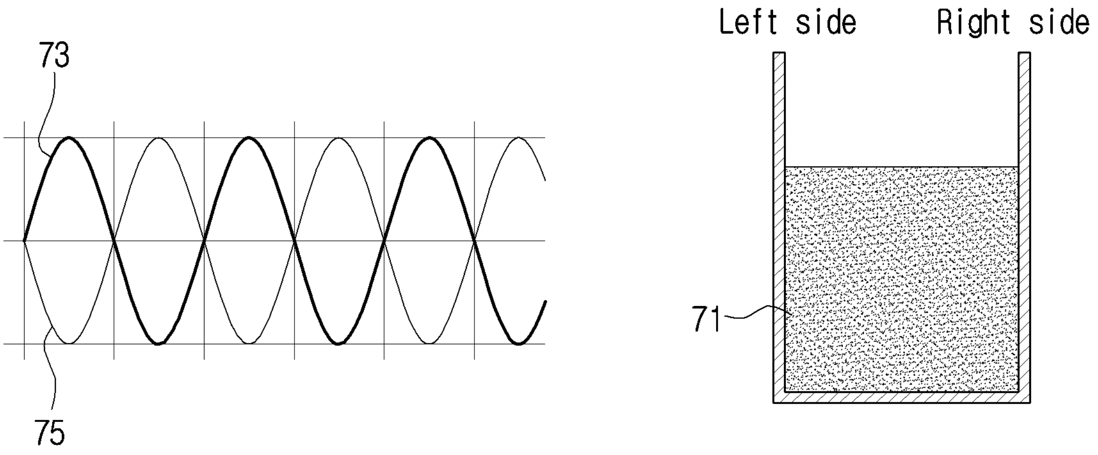

FIGS. 5A, 5B and 5C are diagrams illustrating a driving principle of a serving robot according to one or more embodiments of the disclosure.

Referring to FIG. 5A, a liquid object 71 is illustrated. For example, the liquid object 71 may be a food item including water, a beverage, or liquid provided in a containing such a glass or a bowl. For example, if the container including the liquid object 71 is loaded on the tray of the loading part 20 of the serving robot 100, and the serving robot 100 does not move, the liquid object 71 may maintain a stable state as illustrated in FIG. 5A. The serving robot 100 may load the liquid object 71, and move for serving.

Referring to FIG. 5B, the state of the liquid object 71 loaded on the accelerating serving robot 100 is illustrated.

If the serving robot 100 in a halt state moves, acceleration is applied from the rear side to the liquid object 71 loaded on the serving robot 100. According to an embodiment, if the serving robot 100 moving in a constant velocity accelerates, acceleration is applied from the rear side to the liquid object 71 loaded on the serving robot 100. By the law of inertia, the liquid object 71 in a halt state (or, a state in a constant velocity) may exhibit a property of trying to keep maintaining the previous state. However, as the liquid object 71 has fluidity, it may exhibit the state illustrated in FIG. 5B. If the serving robot 100 keeps accelerating, the liquid object 71 may keep exhibiting the state illustrated in FIG. 5B. In this case, the liquid object 71 flows over the end part of the container, and as such, the liquid object 71 gets to overflow and spill.

According to an embodiment, the serving robot 100 may maintain the constant velocity again if it accelerates by greater than or equal to a specific velocity. The feature that the accelerating serving robot 100 maintains a constant velocity means that the acceleration is 0, and also means that (–) acceleration is applied to the serving robot 100 until the acceleration becomes 0. According to an embodiment, the serving robot 100 may decelerate according to the surrounding situation, and (–) acceleration is applied to the serving robot 100. In this case, the liquid object 71 loaded on the serving robot 100 may exhibit a state opposite to the state illustrated in FIG. 5B. That is, acceleration may be applied from the front side to the liquid object 71, and the water level of the liquid object 71 in the direction wherein the acceleration is applied may become higher.

According to an embodiment, the liquid object 71 may vibrate according to a change of the velocity of the serving robot 100. That is, the water level of the liquid object 71 may become higher alternatingly in the left side direction and the right side direction of the container. As described above, if the water surface in one direction of the liquid object 71 becomes higher or vibrates, the liquid object 71 may overflow. Accordingly, a serving robot 100 that can stably serve the liquid object 71 even if the serving robot 100 moves (or, the velocity changes) is needed.

According to an embodiment, a liquid object 71 that maintains a stable state even if acceleration is applied to the serving robot 100 is illustrated. The serving robot 100 according to the disclosure may detect acceleration (or, a change of the velocity) of the serving robot 100, and rotate the arm 10 and/or the loading part 20 based on the detected acceleration information. Rotation of the arm 10 and/or the loading part 20 applies acceleration in an opposite direction of a size similar to the acceleration applied to the serving robot 100 to the liquid object 71, and accordingly, the liquid object 71 can maintain the stable state as illustrated in FIG. 5C.

According to another embodiment, as illustrated in FIG. 5C, if the liquid object 71 vibrates (as depicted by line 73 in the graph) according to a change of the velocity of the serving robot 100, the serving robot 100 may control the arm 10 and/or the loading part 20 and apply vibration (as depicted by line 75 in the graph) of which phase is opposite to the vibration 73 of the liquid object 71, and can thereby offset the vibration applied to the liquid object 71. That is, the serving robot 100 according to the disclosure may control the arm 10 and the loading part 20 so that the acceleration and deceleration information of the loading part 20 is offset based on the information on the acceleration and deceleration applied to the main body 1. Through the aforementioned process, the serving robot 100 according to the disclosure can stably serve the liquid object 71 to the user.

Figure 6:
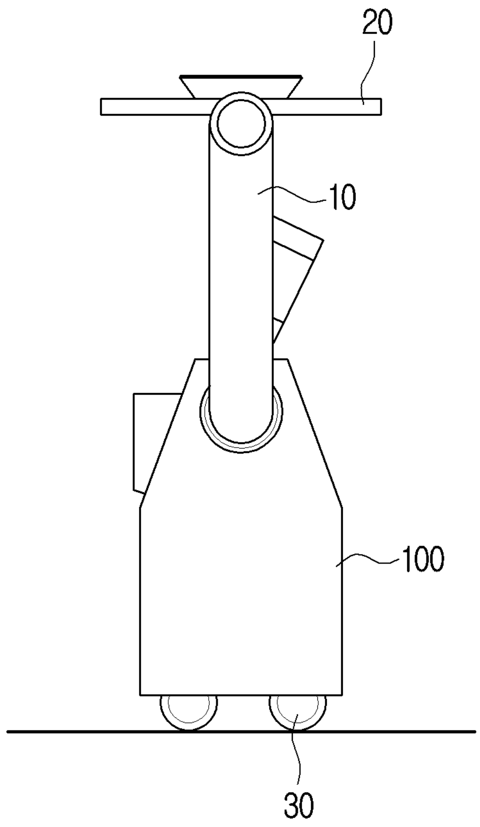
FIG. 6 is a diagram illustrating a serving robot of a constant velocity according to one or more embodiments of the disclosure.

FIG. 6 is a diagram illustrating a serving robot of a constant velocity according to one or more embodiments of the disclosure.

As illustrated in FIG. 6, the serving robot 100 of a constant velocity may maintain the locations of the arm 10 and the loading part 20 in the initial state. For example, the initial state may be a state wherein the arm 10 is located in the upper direction from the main body 1, and the loading part 20 maintains horizontality. Here, the constant velocity may include not only a case wherein the serving robot 100 moves at a regular speed, but also a state wherein the serving robot 100 is halted.

Figure 7:
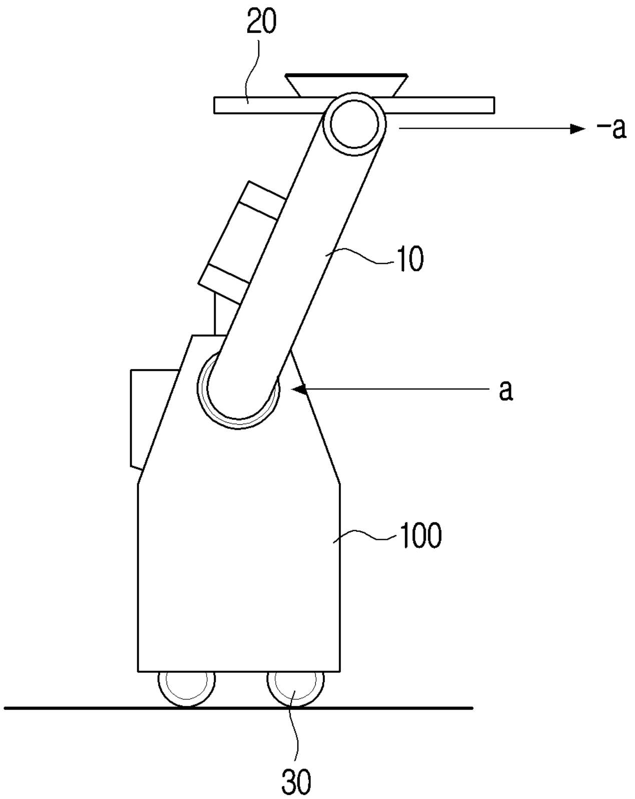
FIG. 7 is a diagram illustrating a serving robot that is accelerated according to one or more embodiments of the disclosure.

FIG. 7 is a diagram illustrating a serving robot that is accelerated according to one or more embodiments of the disclosure.

Referring to FIG. 7, a serving robot 100 that is accelerated is illustrated. On the loading part 20 of the serving robot 100, food may be loaded. Also, the serving robot 100 may move. If the serving robot 100 in a halt state moves, acceleration may be applied from the rear side to the serving robot 100. The acceleration applied to the serving robot 100 may be applied not only to the main body 1 but also to the loading part 20, and it may also be applied to the food loaded on the loading part 20.

The serving robot 100 may detect acceleration information of the main body 1 and acceleration information of the loading part 20. The serving robot 100 may rotate the arm 10 and the loading part 20 so that the acceleration information of the loading part 20 is offset based on the detected acceleration information of the main body 1. According to an embodiment, the serving robot 100 may store acceleration information in the memory 165. The serving robot 100 may rotate the arm 10 and the loading part 20 based on the stored acceleration information. For example, if acceleration of 'a' is applied to the main body 1 according to a movement or acceleration of the serving robot 100, the serving robot 100 may rotate the arm 10 backward so that the acceleration of the loading part 20 becomes 0 (or, becomes closer to 0). The serving robot 100 may rotate the arm 10 backward by a predetermined angle centered around the axis on one end of the arm 10 connected to the main body 1 based on the detected acceleration information of the main body 1.

As illustrated in FIG. 6, in the initial stage, the arm 10 and the loading part 20 may be in a perpendicular state. Accordingly, if the arm 10 rotates backward by a predetermined angle, the loading part 20 may also be tilted as much as the predetermined angle. In this case, the food loaded on the loading part 20 may be in an unstable state wherein it can be pushed to one side or fall on the ground. Accordingly, if the arm 10 rotates backward by the predetermined angle, the serving robot 100 may maintain the horizontality of the loading part 20 by rotating the loading part 20.

If the serving robot 100 is accelerated to a specific velocity, it may maintain a constant velocity. The accelerating serving robot 100 maintains a constant velocity means that acceleration of '-a' is applied to the serving robot 100 until the velocity becomes a constant velocity. If the serving robot 100 maintains a constant velocity after it is accelerated, the serving robot 100 may control the arm 10 and the loading part 20 based on the detected information on the change of the velocity of the main body 1. That is, the serving robot 100 may rotate the arm 10 forward centered around the axis on one end of the arm 10, and move the arm 10 to the initial location. Accordingly, the serving robot 100 may rotate the loading part 20 so that the loading part 20 maintains horizontality based on the forward rotation of the arm 10.

Accordingly, even if the serving robot 100 moves or accelerates, the acceleration applied to the food loaded on the loading part 20 becomes 0 (or, become closer to 0), and thus the serving robot 100 can stably serve the food.

Figure 8:
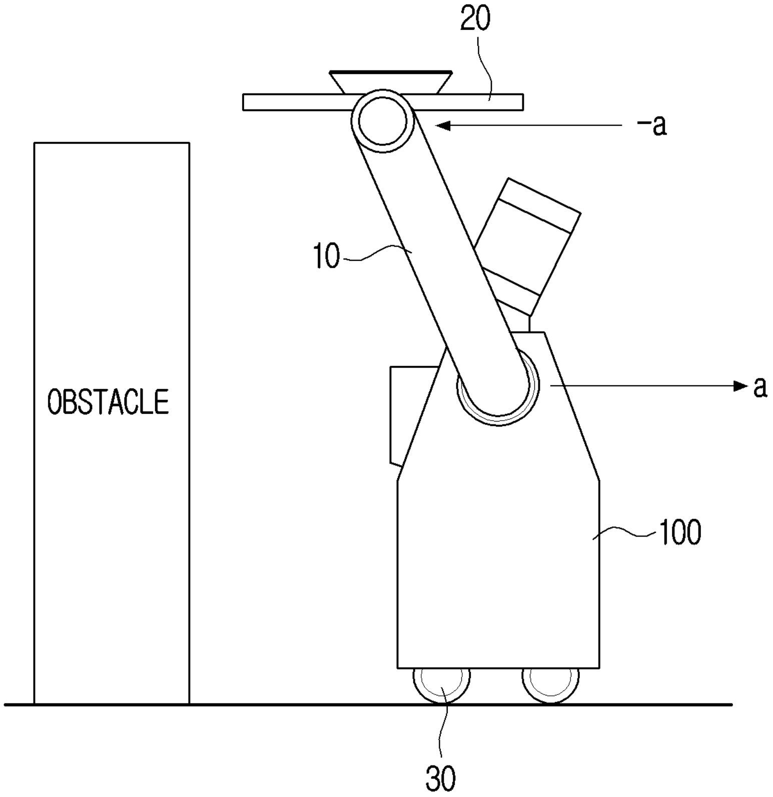
FIG. 8 is a diagram illustrating a serving robot that is decelerated according to one or more embodiments of the disclosure.

FIG. 8 is a diagram illustrating a serving robot that is decelerated according to one or more embodiments of the disclosure.

Referring to FIG. 8, a serving robot 100 that is decelerated is illustrated. The moving serving robot 100 may decelerate. For example, the serving robot 100 may decelerate in case it found an obstacle, moved to a corner area, or arrived at a destination of serving. When the serving robot 100 decelerates, acceleration may be applied from the front side to the serving robot 100. The acceleration applied to the serving robot 100 is applied not only to the main body 1 but also to the loading part 20, and it may also be applied to the food loaded on the loading part 20.

The serving robot 100 may detect deceleration information of the main body 1 and deceleration information of the loading part 20. The serving robot 100 may rotate the arm 10 and the loading part 20 so that the deceleration information of the loading part 20 is offset based on the detected deceleration information of the main body 1. According to an embodiment, the serving robot 100 may store deceleration information in the memory 165. The serving robot 100 may rotate the arm 10 and the loading part 20 based on the stored deceleration information. For example, if acceleration of 'a' is applied to the main body 1 according to deceleration of the serving robot 100, the serving robot 100 may rotate the arm 10 forward so that the acceleration of the loading part 20 becomes 0 (or, becomes closer to 0). The serving robot 100 may rotate the arm 10 forward by a predetermined angle centered around the axis on one end of the arm 10 connected to the main body 1 based on the detected deceleration information of the main body 1.

When the arm 10 rotates forward by the predetermined angle, the loading part 20 may also be tilted by the predetermined angle. In this case, the food loaded on the loading part 20 may be in an unstable state. Accordingly, if the arm 10 rotates forward by the predetermined angle, the serving robot 100 may maintain the horizontality of the loading part 20 by rotating the loading part 20.

If the serving robot 100 is decelerated to a specific velocity, it may maintain a constant velocity (including a case wherein the velocity is 0). The feature that the decelerating serving robot 100 maintains a constant velocity means that acceleration of '–a' is applied to the serving robot 100 until the velocity becomes a constant velocity. If the serving robot 100 maintains a constant velocity after it is decelerated, the serving robot 100 may control the arm 10 and the loading part 20 based on the detected information on the change of the velocity of the main body 1. That is, the serving robot 100 may rotate the arm 10 backward centered around the axis on one end of the arm 10, and move the arm 10 to the initial location. Accordingly, the serving robot 100 may rotate the loading part 20 so that the loading part 20 maintains horizontality based on the backward rotation of the arm 10.

Accordingly, even if the serving robot 100 decelerates, the serving robot 100 can stably serve the food.

For example, depending on various scenarios, the serving robot 100 may repeat acceleration and deceleration while serving food. In case the serving robot 100 repeats acceleration and deceleration, liquid food loaded on the loading part 20 may vibrate as illustrated in FIG. 5C. The serving robot 100 according to the disclosure may detect acceleration and deceleration information of the main body 1 and acceleration and deceleration information of the loading part 20, and control the arm 10 and the loading part 20 by the aforementioned method, and can thereby offset the vibration of the liquid food loaded on the loading part 20. Accordingly, the serving robot 100 according to the disclosure can stably serve liquid food even if it repeats acceleration and deceleration.

Figure 9A:
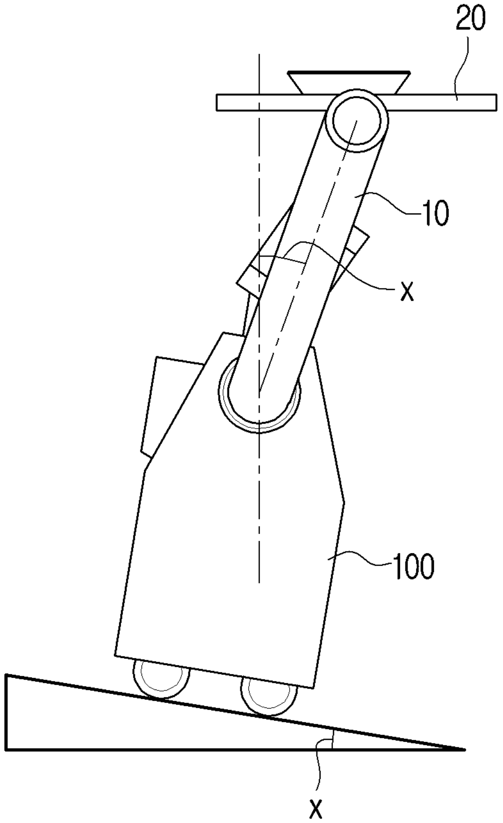
FIGS. 9A and 9B are diagrams illustrating a serving robot located on a slope according to one or more embodiments of the disclosure.
Figure 9B:
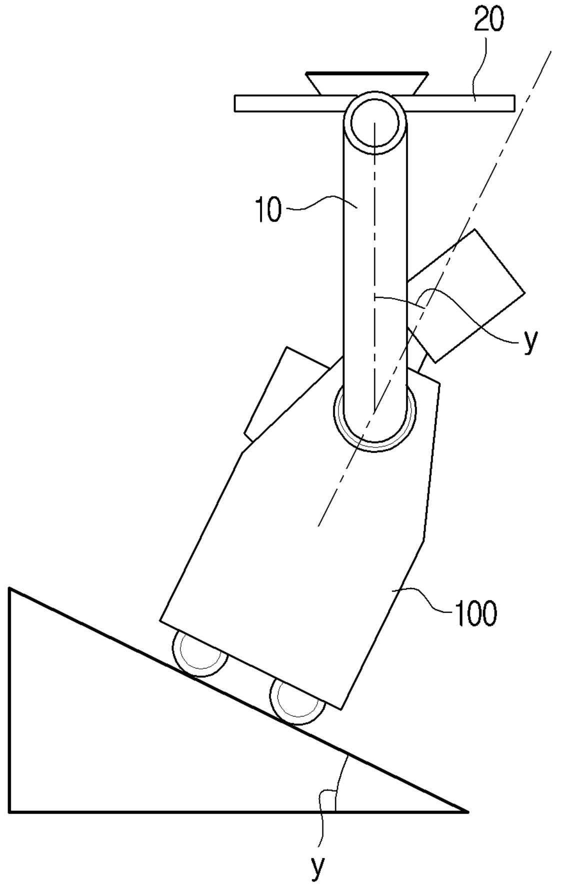

FIGS. 9A and 9B are diagrams illustrating a serving robot located on a slope according to one or more embodiments of the disclosure.

In FIGS. 9A and 9B, a serving robot 100 moving slopes in different angles is illustrated. When the serving robot 100 serves food, it may move on a slope according to the state of the bottom. Angles of a slope may be diverse. As an example, as illustrated in FIG. 9A, the angle of a slope may be x, and as illustrated in FIG. 9B, the angle of a slope may be y. The angle x may be an angle smaller than the angle y.

When the serving robot 100 moves on a slope, the serving robot 100 may detect the tilt of the main body 1. Then, the serving robot 100 may maintain the loading part 20 to be horizontal by rotating the arm 10 and/or the loading part 20 based on the detected tilt of the main body 1.

As illustrated in FIG. 9A, the angle of the slope may be x which is an angle smaller than a reference angle. The reference angle may be a predetermined angle. In this case, the serving robot 100 may maintain the horizontality of the loading part 20 by rotating only the loading part 20 without rotating the arm 10. That is, the serving robot 100 may maintain the horizontality of the loading part 20 by rotating only the loading part 20 based on the detected tilt angle x of the main body 1.

As illustrated in FIG. 9B, the angle of the slope may be y which is an angle bigger than the predetermined angle. In this case, it would be difficult for the serving robot 100 to maintain the horizontality of the loading part 20 by rotating only the loading part 20. The serving robot 100 may maintain the horizontality of the loading part 20 by rotating the arm 10 and the loading part 20. That is, the serving robot 100 may maintain the horizontality of the loading part 20 by rotating the arm 10 and the loading part 20 based on the detected tilt angle y of the main body 1.

Accordingly, the serving robot 100 can stably serve food regardless of the angle of slope on which the serving robot 100 moves. For example, the serving robot 100 is able to take into consideration the angle of the slope and adjust the rotation of the loading part 20, the rotation of the arm 10 or the rotation of both the loading part 20 and the arm 10 based on the angle of slope.

Figure 10:
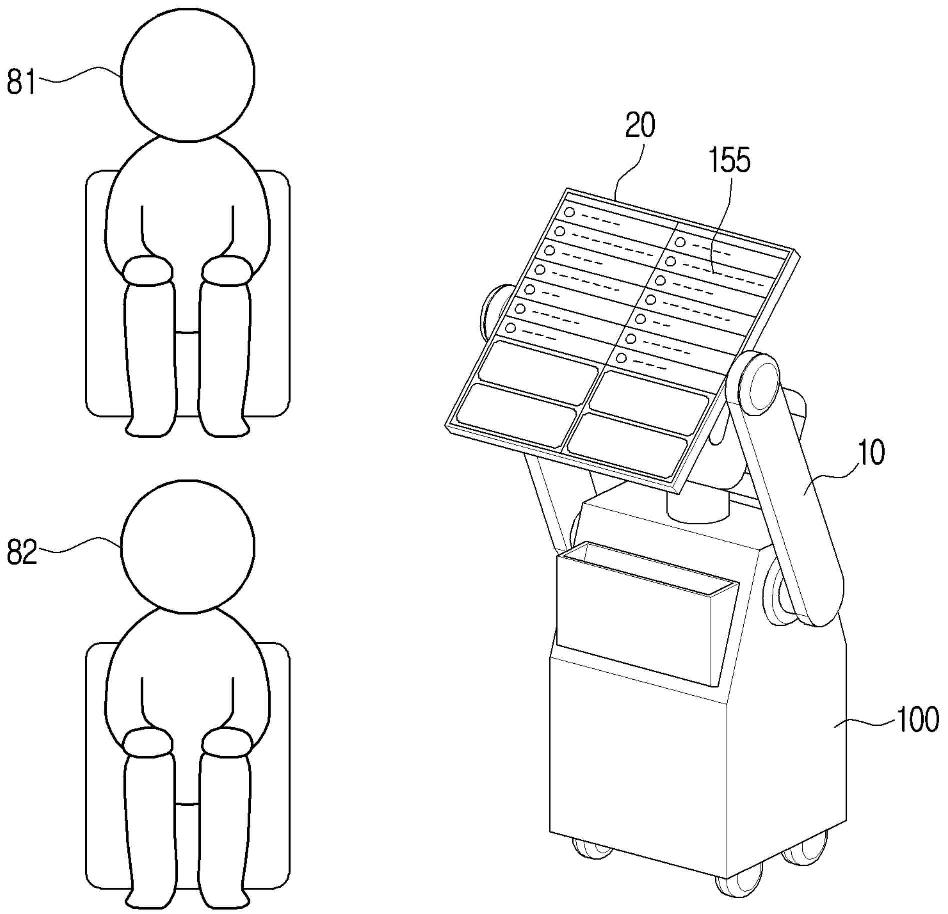
FIG. 10 is a diagram illustrating a serving robot receiving orders according to one or more embodiments of the disclosure.

FIG. 10 is a diagram illustrating a serving robot receiving orders according to one or more embodiments of the disclosure.

Referring to FIG. 10, a serving robot 100 receiving orders from users is illustrated. As described above, one surface of the loading part 20 of the serving robot 100 may include a tray on which food is loaded, and the other surface may include a display 155. The serving robot 100 may rotate the loading part 20 so that the tray or the display 155 is facing toward the upper direction.

For example, the serving robot 100 may capture an image regarding the surrounding environment by using the camera 145. The serving robot 100 may identify users 81, 82 in the captured image. If the serving robot 100 identifies the users 81, 82 while food is not loaded on the loading part 20, the serving robot 100 may rotate the loading part 20 so that the display 155 is facing toward the upper direction. When the display 155 is facing toward the upper direction, the serving robot 100 may display information related to food on the display 155. The serving robot 100 may rotate the arm 10 and the loading part 20 including the display 155 by an appropriate angle for receiving orders from the users 81, 82. For example, the serving robot 100 may recognize the face areas (e.g., facial regions) of the users 81, 82 in the captured image, and may rotate the arm 10 and the loading part 20 including the display 155 based on the angles determined from the location of the display 155 of the loading part 20 and the locations of the recognized face areas of the users 81, 82. That is, the serving robot 100 may rotate the arm 10 and the loading part 20 based on the capture image (e.g., based on a location of the face of a user identified in the capture image. However, the disclosure is not limited thereto, and as such, according to another embodiment, the serving robot 100 may rotate the arm 10 and the loading part 20 based on another criteria satisfied in the capture image.

As an example, if the first user 81 is an adult, and the face area of the first user 81 is a location higher than the location of the display 155, the serving robot 100 may rotate the arm 10 forward by 10 degrees, and rotate the loading part 20 including the display 155 forward by 5 degrees. Meanwhile, if the second user 82 is a kid, and the face area of the second user 82 is a location similar to the location of the display 155, the serving robot 100 may rotate the arm 10 forward by 30 degrees, and rotate the loading part 20 including the display 155 forward by 20 degrees. Also, in case the first user 81 and the second user 82 are located to be adjacent, the serving robot 100 may change only the direction of the display 155 so that it is facing toward the first user 81 or the second user 82. According to an embodiment, in case the first user 81 and the second user 82 are located to be distanced from each other, when input of an order from the first user 81 is completed, the serving robot 100 may move to the second user 82 and receive input of an order from the second user 82.

The serving robot 100 may receive input of an order by a touch input through the display 155 implemented as a touch screen, and receive input of an order by a voice through the microphone 150. Accordingly, the serving robot 100 may give help so that the user can conveniently select food.

When a user selects food, the serving robot 100 may identify the user who selected food and the selected food. The serving robot 100 may use information on the identified user and food when serving the food. Also, the serving robot 100 may transmit the information on the selected food to an external device through the communication interface 135. For example, the external device may be an electronic device located in the kitchen. The cooker may cook the food based on the information on the food received from the electronic device located in the kitchen.

Figure 11:
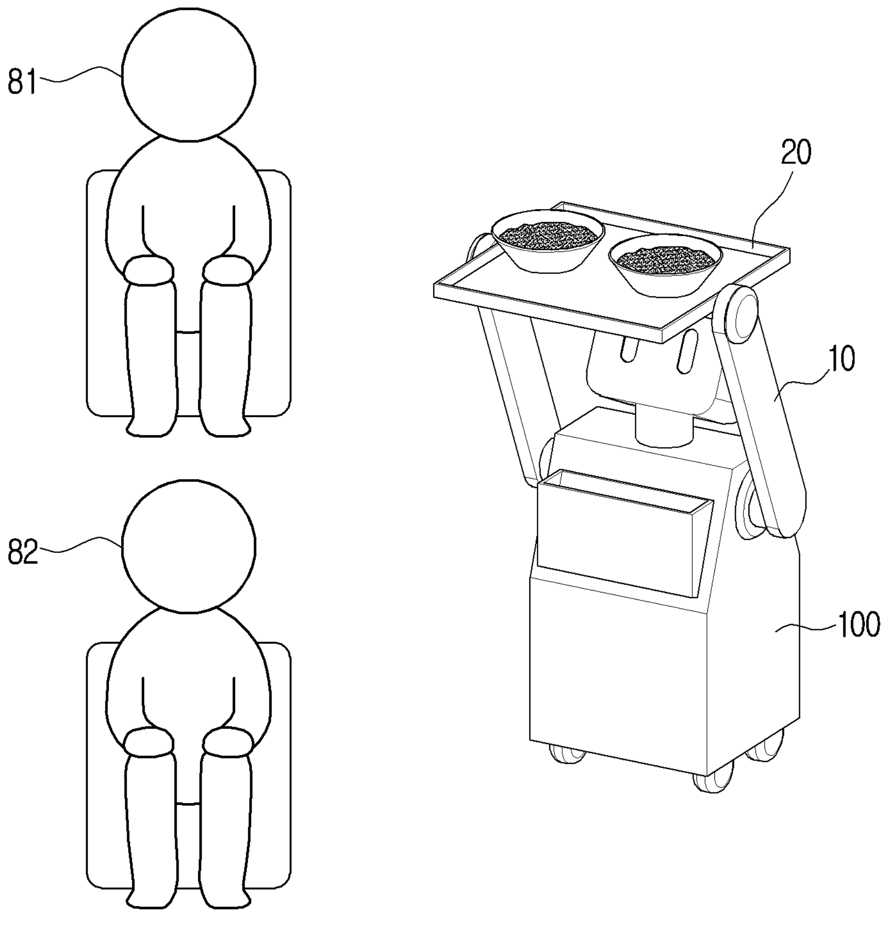
FIG. 11 is a diagram illustrating a serving robot serving ordered food according to one or more embodiments of the disclosure.

FIG. 11 is a diagram illustrating a serving robot serving ordered food according to one or more embodiments of the disclosure.

Referring to FIG. 11, a serving robot 100 serving food is illustrated. The serving robot 100 may rotate the loading part 20 so that the tray is facing toward the upper direction for loading food. The serving robot 100 may move to serve the food loaded on the tray to the users 81, 82. When the serving robot 100 moves, the serving robot 100 may control the arm 10 and the loading part 20 based on acceleration and deceleration information by the aforementioned method for stably transmitting food.

When the serving robot 100 arrives at the users 81, 82, the serving robot 100 may serve the food by rotating the arm 10 and the loading part 20 based on the identified user and the identified food. As an example, the first user 81 may order A food, and the second user 82 may order B food. The serving robot 100 may rotate the arm 10 forward by 15 degrees for serving the A food to the first user 81. Then, the serving robot 100 may rotate the loading part 20 together so that the loading part 20 on which the food is loaded maintains horizontality. Also, the serving robot 100 may output a guide message such as "Here is food A you ordered" to the first user 81 through the speaker 160. In case serving of the A food to the first user 81 was completed, the serving robot 100 may serve the B food to the second user 82. The serving robot 100 may rotate the arm 10 forward by 30 degrees for serving the B food to the second user 82. Then, the serving robot 100 may rotate the loading part 20 together so that the loading part 20 on which the food is loaded maintains horizontality. Also, the serving robot 100 may output a guide message such as "Here is food B you ordered" to the second user 82 through the speaker 160. As described in FIG. 10, the serving robot 100 may serve food by converting only the directions according to the locations of the first user 81 and the second user 82, and serve food by moving.

So far, various embodiments of the serving robot 100 were described. Hereinafter, a control method of the serving robot 100 will be described.

Figure 12:
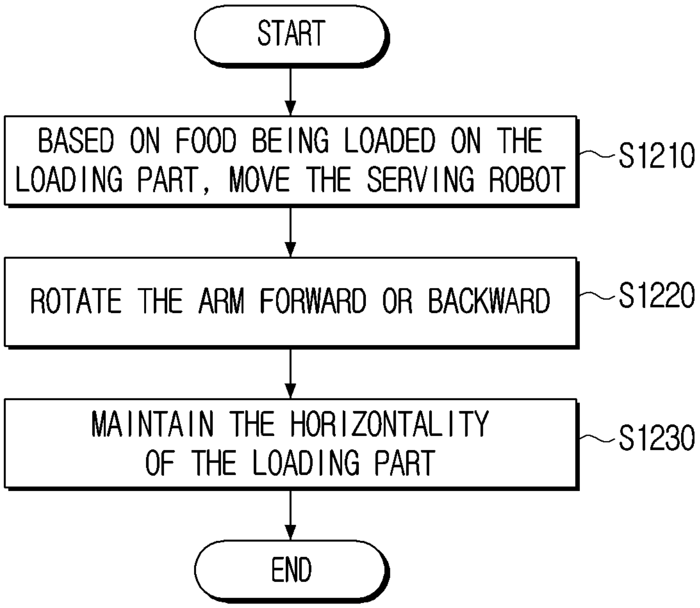
FIG. 12 is a flow chart illustrating a control method of a serving robot according to one or more embodiments of the disclosure.

FIG. 12 is a flow chart illustrating a control method of a serving robot according to one or more embodiments of the disclosure.

Referring to FIG. 12, in operation S1210, when food is loaded on the loading part, the serving robot may move. In operation S1220, while moving, the serving robot 100 may rotate the arm connected to the main body 10 of the serving robot 100. For example, the arm may include one end rotatably connected to the main body, and another end rotatably connected to the loading part. According to an embodiment, the serving robot 100 may rotate the arm forward or backward according to acceleration and deceleration in operation S1220. In S1230, the serving robot 100 may maintain the horizontality of the loading part. For example, the serving robot 100 may maintain the horizontality of the loading part by rotating the loading part based on the forward or backward rotation of the arm.

For example, the serving robot may detect acceleration and deceleration information of the main body and acceleration and deceleration information of the loading part. The serving robot may rotate the arm forward or backward so that the acceleration and deceleration information of the loading part is offset based on the detected acceleration and deceleration information of the main body.

If the serving robot is accelerated, the serving robot may rotate the arm backward by a predetermined first angle centered around the axis on one end of the arm connected to the main body based on the detected acceleration information of the main body. Then, the serving robot may maintain the horizontality of the loading part by rotating the loading part based on the predetermined first angle. If the serving robot maintains a constant velocity after it is accelerated, the serving robot may rotate the arm forward centered around the axis on one end of the arm based on the detected information on the change of the velocity of the main body, and move the arm to the initial location. Then, the serving robot may maintain the horizontality of the loading part by rotating the loading part based on the forward rotation of the arm.

If the serving robot is decelerated, the serving robot may rotate the arm forward by a predetermined second angle centered around the axis on one end of the arm connected to the main body based on the detected deceleration information of the main body. Then, the serving robot may maintain the horizontality of the loading part by rotating the loading part based on the predetermined second angle. If the serving robot maintains a constant velocity after it is decelerated, the serving robot may rotate the arm backward centered around the axis on one end of the arm based on the detected information on the change of the velocity of the main body, and move the arm to the initial location. Then, the serving robot may maintain the horizontality of the loading part by rotating the loading part based on the backward rotation of the arm.

Also, in case the serving robot moves on a slope, the serving robot may detect the tilt of the main body. The serving robot may rotate at least one of the arm or the loading part so that the loading part maintains horizontality based on the detected tilt of the main body.

One surface of the loading part of the serving robot may include a tray, and the other surface may include a display. The serving robot may rotate the loading part so that the tray or the display is facing toward the upper direction. When the display is facing toward the upper direction, the serving robot may display information related to food.

The serving robot may capture an image regarding the surrounding environment. The serving robot may identify an customer from the photographed image while food is not loaded on the loading part. If the serving robot identifies the customer, the display may rotate the loading part so that the display is facing toward the upper direction. The serving robot may receive input of an order from the customer. For example, the serving robot may receive input of an order by a touch input through the display implemented as a touch screen or a voice input through the speaker. The serving robot may identify the food selected by the customer.

The serving robot may rotate the loading part so that the tray is facing toward the upper direction for loading food. Then, the serving robot may control the arm and the loading part by using acceleration and deceleration information for safely transmitting the food to the customer. When the serving robot arrives at the customer, the serving robot may rotate the arm and the loading part for serving the food to the customer based on the identified customer and the identified food.

Accordingly, the serving robot according to the disclosure can safely move items such as food, so that a user can conveniently order and receive items such as food. Also, the serving robot according to the disclosure can reinforce interaction with a user.

The effects according to the disclosure are not limited to the effects mentioned above, and other effects that were not mentioned could be clearly understood by a person skilled in the art from the following descriptions.

Also, a control method of a serving robot according to the aforementioned various embodiments can be provided as a computer program product. A computer program product may include an S/W program itself, or a non-transitory computer readable medium having an S/W program stored therein.

A non-transitory computer readable medium refers to a medium that stores data semi-permanently, and is readable by machines, but not a medium that stores data for a short moment such as a register, a cache, and a memory, etc. Specifically, the aforementioned various applications or programs may be provided while being stored in a non-transitory computer readable medium such as a CD, a DVD, a hard disk, a blue-ray disk, a USB, a memory card, a ROM and the like.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A serving robot configured to move on a slope, the serving robot comprising:
- a main body;
- a sensor configured to detect tilt information of a bottom surface of the main body or tilt information of the main body, the tilt information of the bottom surface of the main body or the tilt information of the main body corresponding to the slope;
- a loading part configured to load an object;
- an arm comprising a first end rotatably connected to the main body, and a second end rotatably connected to the loading part;
- a driving part; and
- at least one processor is configured to:
  - control the driving part to maintain horizontality of the loading part at a time when the arm is rotated in a first direction or a second direction opposite to the first direction, and
  - control the driving part to:
    - rotate at least one of the arm or the loading part based on the slope satisfying a first criterion to maintain horizontality of the loading part, and
    - rotate the arm and the loading part based on the slope satisfying a second criterion to maintain horizontality of the loading part,
    - wherein the first criterion indicates that the slope is less than or equal to a reference value, and the second criterion indicates that the slope is greater than the reference value.

2. The serving robot of claim 1, wherein the sensor is further configured to detect acceleration or deceleration of the main body,
- wherein the object is a food item, and
- wherein the at least one processor is configured to:
  - based on the food item being loaded on the loading part and the serving robot moving, obtain, from the sensor, first information based on the detected acceleration or deceleration of the main body, and
  - based on the first information, control the driving part to rotate the arm in the first direction or in the second direction to offset an effect of the acceleration or deceleration of the main body in the loading part.

3. The serving robot of claim 2,
- wherein the at least one processor is configured to:
- based on the serving robot accelerating in the first direction, control the driving part to rotate the arm in the second direction from an initial location, by a first angle centered around an axis on the first end of the arm connected to the main body based on the first information of the main body, and
- control the driving part to rotate the loading part so that the loading part maintains horizontality based on the first angle.

4. The serving robot of claim 3,
- wherein the at least one processor is configured to:
- based on the serving robot maintaining a constant velocity after the acceleration, control the driving part to rotate the arm in the first direction centered around the axis on the first end of the arm to move the arm to the initial location, and
- control the driving part to rotate the loading part so that the loading part maintains horizontality based on the rotation of the arm in the first direction.

5. The serving robot of claim 2,
- wherein the at least one processor is configured to:
- based on the serving robot decelerating in the first direction, control the driving part to rotate the arm in the first direction from an initial location, by a second angle centered around an axis on the first end of the arm connected to the main body based on the first information of the main body, and
- control the driving part to rotate the loading part so that the loading part maintains horizontality based on the second angle.

6. The serving robot of claim 5,
- wherein the at least one processor is configured to:
- based on the serving robot maintaining a constant velocity after the deceleration, control the driving part to rotate the arm in the second direction centered around the axis on the first end of the arm to move the arm to the initial location, and
- control the driving part to rotate the loading part so that the loading part maintains horizontality based on the rotation of the arm in the second direction.

7. The serving robot of claim 2,
- wherein the loading part comprises a first surface comprising a tray, and a second surface comprising a display, and
- wherein the at least one processor is configured to:
- control the driving part to rotate the loading part to face the tray or the display in an upward direction, and
- based on the display facing in the upward direction, control the display to display information related to the food item.

8. The serving robot of claim 7, further comprising:
- a camera,
- wherein the at least one processor is configured to:
- control the camera to capture an image, and
- based on identifying an customer from the captured image while food item is not loaded on the loading part, control the driving part to rotate the loading part so that the display is facing toward the upward direction.

9. The serving robot of claim 8,
- wherein the at least one processor is configured to:
- identify food item selected by the customer.

10. The serving robot of claim 9,
- wherein the at least one processor is configured to:
- control the driving part to rotate the loading part so that the tray is facing toward the upward direction for loading the food item, and
- based on the identified customer and the food item selected by the customer, control the driving part to rotate the arm and the loading part for serving the food item to the customer.

11. A control method of a serving robot configured to move on a slope, the method comprising:

moving the serving robot based on an object being loaded on a loading part of the serving robot;

rotating an arm connected to a main body of the serving robot, the arm including a first end rotatably connected to the main body, and a second end rotatably connected to the loading part;

detecting tilt information of a bottom surface of the main body or tilt information of the main body, the tilt information of the bottom surface of the main body or the tilt information of the main body corresponding to the slope;

maintains the horizontality of the loading part at a time when the arm is rotated in a first direction or a second direction opposite to the first direction;

rotating at least one of the arm or the loading part based on the slope satisfying a first criterion to maintain horizontality of the loading part; and rotating the arm and the loading part based on the slope satisfying a second criterion to maintain horizontality of the loading part, wherein the first criterion indicates that the slope is less than or equal to a reference value, and the second criterion indicates that the slope is greater than the reference value.

12. The control method of a serving robot of claim 11, further comprising:

based on food item being loaded on the loading part and the serving robot moving, obtaining first information based on the detected acceleration or deceleration of the main body, wherein the rotating the arm in the first direction or the second direction comprises:

based on the first information, rotating the arm in the first direction or the second direction to offset an effect of the acceleration or deceleration of the main body in the loading part.

13. The control method of a serving robot of claim 12, wherein the rotating the arm in the first direction or the second direction comprises:

based on the serving robot accelerating in the first direction, rotating the arm in the second direction from an initial location, by a first angle centered around an axis on the first end of the arm connected to the main body based on the first information of the main body, and wherein the maintaining the horizontality of the loading part comprises:

rotating the loading part so that the loading part maintains horizontality based on the first angle.

14. The control method of a serving robot of claim 13, wherein the rotating the arm in the first direction or the second direction comprises:

based on the serving robot maintaining a constant velocity after the acceleration, rotating the arm in the first direction centered around the axis on the first end of the arm to move the arm to the initial location, and wherein maintaining the horizontality of the loading part comprises:

rotating the loading part so that the loading part maintains horizontality based on the rotation of the arm in the first direction.

15. The serving robot of claim 1, wherein the at least one processor is configured to:

based on the serving robot accelerating in the first direction, control the driving part to rotate the arm in the second direction from an initial location, by a first angle centered around an axis on the first end of the arm connected to the main body, and based on the serving robot maintaining a constant velocity after the acceleration, control the driving part to rotate the arm in the first direction centered around the axis on the first end of the arm to move the arm to the initial location.

16. The serving robot of claim 1, wherein the at least one processor is configured to:

based on the serving robot decelerating in the first direction, control the driving part to rotate the arm in the first direction from an initial location, by a second angle centered around an axis on the first end of the arm connected to the main body, and based on the serving robot maintaining a constant velocity after the deceleration, control the driving part to rotate the arm in the second direction centered around the axis on the first end of the arm to move the arm to the initial location.

17. The control method of a serving robot of claim 11, wherein the rotating the arm in the first direction or the second direction comprises:

based on the serving robot accelerating in the first direction, rotating the arm in the second direction from an initial location, by a first angle centered around an axis on the first end of the arm connected to the main body, and based on the serving robot maintaining a constant velocity after the acceleration, rotating the arm in the first direction centered around the axis on the first end of the arm to move the arm to the initial location.

18. The control method of a serving robot of claim 11, wherein the rotating the arm in the first direction or the second direction comprises:

based on the serving robot decelerating in the first direction, controlling the driving part to rotate the arm in the first direction from an initial location, by a second angle centered around an axis on the first end of the arm connected to the main body, and based on the serving robot maintaining a constant velocity after the deceleration, controlling the driving part to rotate the arm in the second direction centered around the axis on the first end of the arm to move the arm to the initial location.

* * * * *